United States Patent [19]

Raura

[11] Patent Number: 4,816,092

[45] Date of Patent: Mar. 28, 1989

[54] PROCEDURE AND MEANS FOR REGULATING THE TRANSVERSAL PROFILE OF A CHIP MAT FORMED ON A CONVEYOR BELT

[75] Inventor: Pentti Raura, Valko, Finland

[73] Assignee: Rauma-Repola Oy, Valko, Finland

[21] Appl. No.: 108,085

[22] Filed: Oct. 13, 1987

[30] Foreign Application Priority Data

Oct. 13, 1986 [FI] Finland ................................ 864131

[51] Int. Cl.4 ................................................ B29C 43/22

[52] U.S. Cl. .................................... 156/62.2; 19/157; 19/296; 100/154; 156/555; 156/583.5; 156/583.91; 264/109; 425/83.1; 425/373

[58] Field of Search .................... 156/62.2, 62.4, 62.8, 156/583.5, 555, 583.91; 264/109, 112, 113, 121, 122; 425/83.1, 141, 373; 19/157, 296; 100/118, 151, 153, 154, 155; 198/620, 624, 628

[56] References Cited

U.S. PATENT DOCUMENTS

| | | | |
|---|---|---|---|
| 2,646,381 | 7/1953 | Duvall | 425/83.1 |
| 2,736,362 | 2/1956 | Slayter et al. | 425/83.1 |
| 2,746,895 | 5/1956 | Duvall | 425/83.1 |
| 4,164,386 | 8/1979 | Stabler | 425/141 |
| 4,164,387 | 8/1979 | Schermutzki et al. | 425/141 |
| 4,402,778 | 4/1983 | Goldsworthy | 100/151 |
| 4,467,718 | 8/1984 | Held | 100/151 |
| 4,496,429 | 1/1985 | Salminen et al. | 100/153 |
| 4,546,266 | 10/1985 | Kropp | 425/83.1 |
| 4,615,758 | 10/1986 | Held | 425/141 |
| 4,645,632 | 2/1987 | Böttger et al. | 100/154 |

FOREIGN PATENT DOCUMENTS

| | | |
|---|---|---|
| 162118 | 11/1985 | European Pat. Off. . |
| 2214900 | 10/1973 | Fed. Rep. of Germany . |

*Primary Examiner*—Willard Hoag

[57] ABSTRACT

A procedure and a means for correcting the transversal profile of a chip, fibre or equivalent mat being formed on a conveyor belt, said chip mat being formed with the aid of one or several rolls, most appropriately rake rolls, provided above the conveyor belt, in which procedure the free space for the chip mat between the last roll and the conveyor belt is adjusted transversally to the conveyor belt. In the procedure of the invention, substantially at the last roll the height level of the conveyor belt is raised and lowered stripwise transversally to the conveyor belt in order to regulate the transversal profile of the chip mat.

2 Claims, 3 Drawing Sheets

PROCEDURE AND MEANS FOR REGULATING THE TRANSVERSAL PROFILE OF A CHIP MAT FORMED ON A CONVEYOR BELT

BACKGROUND OF THE INVENTION

The present invention concerns a procedure and a means for correcting the transversal profile of a chip, fibre or equivalent mat formed on a conveyor belt, said chip mat being formed with the aid of one or several rolls, most appropriately rake rolls, provided above the conveyor belt, in which procedure the free space for the chip mat, between the last roll and the conveyor belt, is adjusted transversally to the conveyor belt.

In apparatus of this kind, e.g. chip board is manufactured. Chips are then fed to rolls rotating above the means, preferably rake rolls, of which the direction of rotation is the same as the conveyor belt's direction of travel. The thickness of the chip mat being produced is determined by the distance between the last rake roll and the conveyor belt. The distance is usually adjustable. A problem has arisen how to achieve a uniform enough profile of the chip mat. In the EP application No. 0162118 published Nov. 22, 1985, this problem is solved by placing a profile sensor at the ultimate end of the conveyor belt, which transmits information on any non-uniformities to the last roll, of which the side-by-side sections are separately adjustable in vertical direction. In this way, the profile can be regulated transversally to the chip mat. For instance, when the sensor observes a raised portion in the profile, it transmits the information to the machinery operating the sections of said rake roll, said apparatus lowering the roll section located at the respective point so that less chips can pass through at this point, thus producing a level profile. The regulation suggested in the above-identified EP application cited is in itself operable, but recently a need to design the means in a simpler manner has arisen, since this kind of rotating roll adjusted stripwise is cumbersome and costly to manufacture.

The object of the present invention is to provide a procedure and a means of the kind outlined above, for regulating the transversal profile, which are free of the drawback mentioned.

SUMMARY OF THE INVENTION

The procedure of the invention is characterized in that substantially at the site of the last roll the height level of longitudinal sections of the conveyor belt extending side-by-side across the conveyor belt is raised and lowered in order to regulate the transversal profile of the chip mat.

The means for applying the procedure of the invention, comprising a conveyor belt, one or several consecutive, rotating rolls, such as rake rolls, arranged thereabove, is characterized in that below the conveyor belt, substantially at the last roll, there is provided a support bottom consisting of a plurality of side-by-side adjustment members movable in vertical direction, said members causing a change in the conveyor belt profile, in its transversal direction.

An advantageous embodiment of the means of the invention is characterized in that to the adjustment members of the support base has been pivoted an L-shaped lever, connected by one end with a force means, such as a hydraulic cylinder, moving the lever, and at one point, preferably at the L point, pivotally attached to the stationary structure.

The invention offers the advantage that the rake roll can be constructed in a simpler manner, and the complicated structures are located under the conveyor belt out of sight.

BRIEF DESCRIPTION OF THE DRAWINGS

The invention is described in the following in detail, reference being made to the drawing attached, in which.

DESCRIPTION OF THE DRAWING

Figure 1:
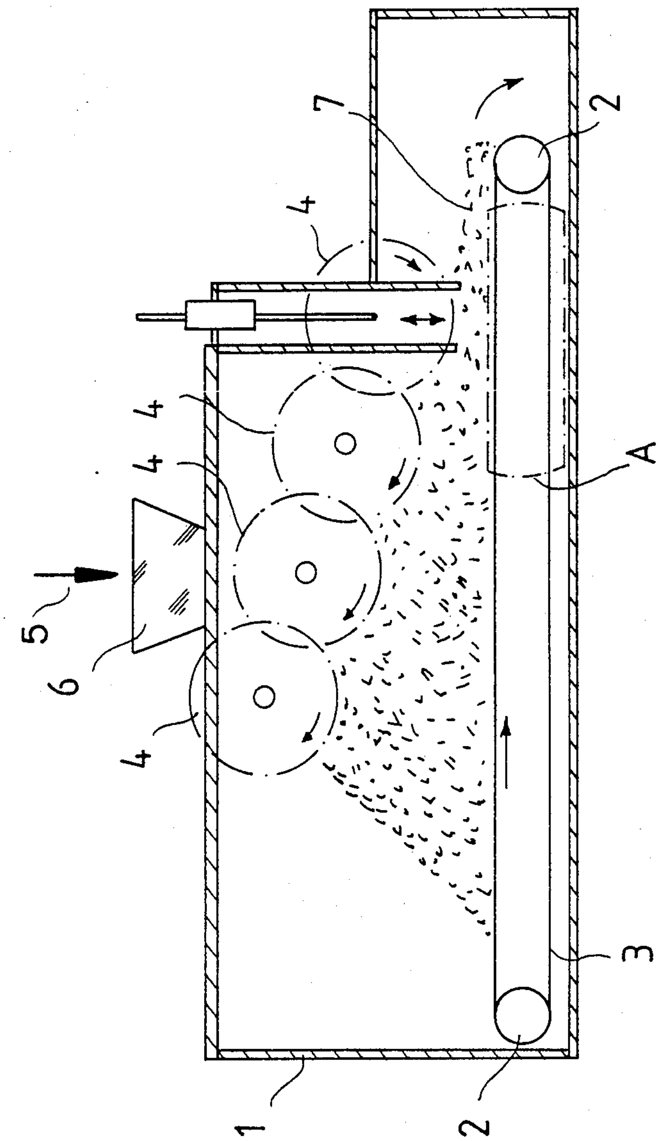
FIG. 1 presents a chip mat forming means according to the invention, in elevational view.

In FIG. 1, a forming means for a chip mat 7 is presented, comprising a frame part 1. Inside the frame part is arranged a conveyor belt 3 running around two sheaves 2, its direction of travel being indicated by an arrow. Above the conveyor belt are placed several, for instance four, rotating rake rolls 4. The direction of rotation of the rolls is indicated by arrows, and it is the same as the direction of rotation of the conveyor belt. The last of these rake rolls in the direction of travel of the conveyor belt, and at the same time the lowest of said rake rolls, is arranged to be vertically adjustable in a manner known in itself in the art. Therefore, the volumetric flow (the thickness) of the chip mat 7 passing through between the conveyor belt 3 and said last rake roll can be regulated.

The chip feed into the chip mat forming means is carried out in the manner indicated by arrow 5 into a chute 6, wherefrom the chips fall on the rolls 4 and, further, onto the conveyor belt 3.

Figure 2:
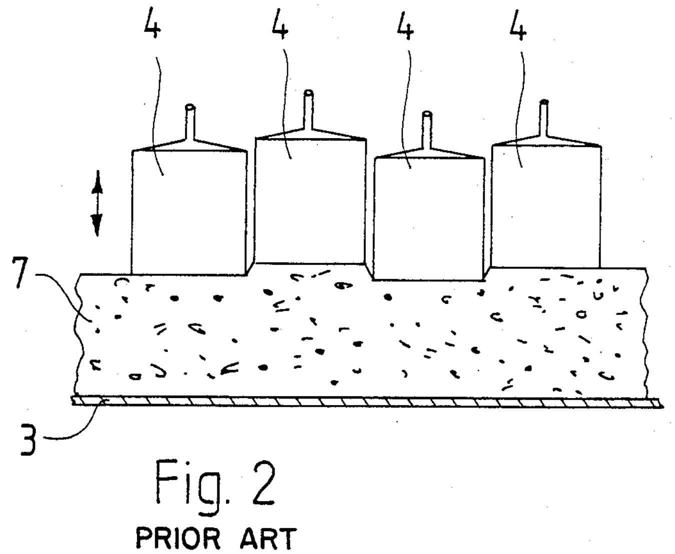
Fig. 2 PRIOR ART
FIG. 2 presents the chip mat profile regulating mechanism of prior art, partly sectioned.

In FIG. 2 is presented a chip mat profile regulation mechanism of the prior art. This figure has been presented in the afore-mentioned EP application No. 0162118. It reveals well enough the state of the art in profile regulation. The last roll 4 is composed of a plurality of sections which may be moved in relation to each other vertically. If the sensor monitoring the uniform quality of the profile of the chip mat 7 observes non-uniformities in the profile, it transmits instructions for correction to the roll 4, whereby the respective roll section ascends, or descrnds, and allows at said point either more or less chips to pass than before correction.

Figure 3:
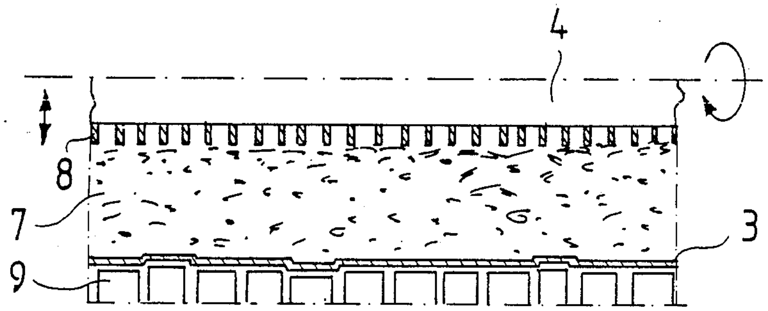
FIG. 3 presents the chip mat regulating mechanism of the invention, partly sectioned.

In FIG. 3 is presented the principle of the profile regulation of the invention. Therein, the rake roll 4, of which only a part is depicted, and which is provided with spikes 8, has been made to be continuous. A support bottom 9 is provided under the conveyor belt, consisting of a plurality of side-by-side, substantially equal adjustment members 9. The adjustment members are movable vertically independent of one another. When one or several adjustment members, in contact with the underside of the conveyor belt 3, are lifted, this action will at the same time lift the conveyor belt at this point and thus affect the transversal profile of the chin mat 7. Similarly, when one or several adjustment members are lowered, inverted action will ensue.

Figure 4:
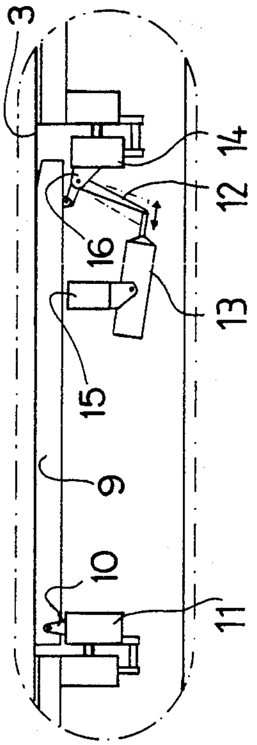
FIG. 4 shows the detail A of FIG. 1, enlarged.

In FIG. 4, an enlargement of the detail A in FIG. 1 is presented. It reveals the support bottom 9 provided under the conveyor belt 3, this bottom thus being understood to consist of side-by-side, substantially equal adjustment members, each adjustment member is turnably carried at the point 10 on a fixed transversal beam 11. The other end of the adjustment member is pivotally attached to an L-shaped lever 12. The other end of the lever is, in turn, connected to a force means 13, such as a hydraulic cylinder, and in its center the L lever is pivotally attached to a fixed transversal beam 14. The hydraulic cylinder 13 is attached to a transversal beam 15. When the hydraulic cylinder 13 is operated, the L lever turns about the pivot 16 and simultaneously turns the adjustment member 9 about the pivot 10 either upwards or downwards. The movement of the adjustment member 9 in turn regulates the transversal profile of the conveyor belt 3, and consequently also that of the chip mat 7.

Figure 5:
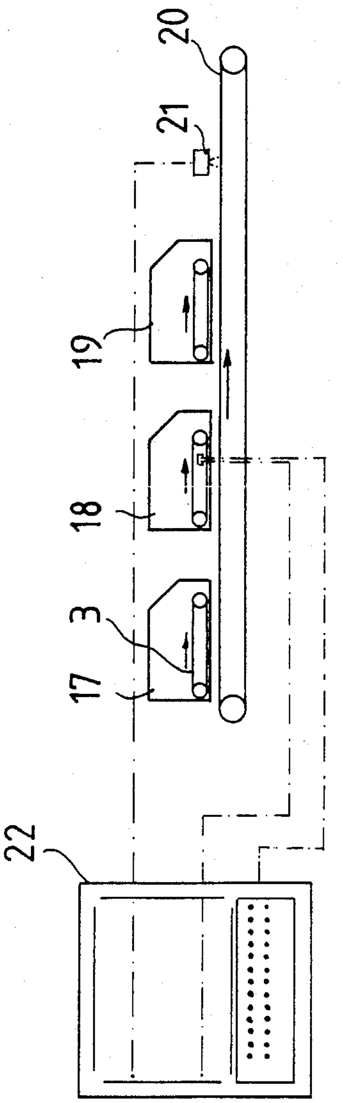
FIG. 5 presents schematically the forming e.g. of a three-layer chip board using the forming means of the invention.

In FIG. 5 is schematically presented part of a chip board production line, consisting of three forming means 17, 18 and 19 arranged consecutively. All of them may be similar to those described above, that is, provided with the profile regulation of the invention. In the present example, however, only the middlemost chip mat forming means is provided with profile adjustment. The principle is such that a thin, fine-grained chip mat is produced in the forming means 17, and which goes from the conveyor belt 3 onto a lower conveyor belt 20 moving in the direction indicated by the arrow and, further, passing under the forming means 18. In the forming means 18 is produced a thicker, coarse chip mat, which settles on top of the preceding layer. The layers formed in this way move onwards on the conveyor belt 20, passing under the forming means 19, from which comes, once again, a fine-grained, thin chip mat to constitute the top layer. The transversal profile of the three-layer chip mat produced in the above manner is monitored by a means 21, which may e.g. be an optical means. The means 21 transmits information on the profile to a correction means 22, including a display terminal where the profile is continuously shown and a correction keyboard communicating with the adjustment members and enabling the adjustment members 9 to be operated and thus the profile to be corrected if need arises.

It is obvious to a person skilled in the art that the invention is not confined to the above-presented embodiment examples, and that it may be varied within the scope of the claims following below.

I claim:

1. In a method of forming a chip or fiber mat on a conveyor belt by passing chips or fibers under at least one roll arranged above the conveyor belt: regulating the height of the transverse profile of the mat between the at least one roll and the conveyor belt by selectively raising and lowering elongated longitudinal sections of the conveyor belt, the sections extending parallel to each other side-by-side across the conveyor belt.

2. An apparatus for regulating the transverse profile of a chip or fiber mat across a substantially horizontal conveyor belt between the latter and at least one roll extending above and transverse to the conveyor belt, comprising: a plurality of elongated support members arranged side-by-side below the conveyor belt transverse to the direction of movement of the latter, means connected to said members for moving the same selectively and individually vertically, and thereby longitudinal sections of the conveyor belt relative to the at lest one roll, the support members having two ends spaced from each other in the direction of movement of the conveyor belt, one end being pivotable about a first, substantially horizontal axis, a plurality of L-shaped levers, each having a first arm connected to the other end of the respective support member and also having a second arm fixedly connected to the first arm at a junction thereof, said levers being pivotable about a second, substantially horizontal axis at said junction, and means for pivoting the second arm about said second axis and thereby the other end of the support member vertically.

* * * * *